United States Patent Office 3,781,402
Patented Dec. 25, 1973

3,781,402
PROCESS FOR THE PRODUCTION OF BRUSHES OR A PART THEREOF INCLUDING THE BRISTLES
Peter Hanggi, 23b Birchlerstrasse, 8600 Dubendorf 2, Switzerland, and Hermann Budmiger, 114 Muhlmatt, 4206 Seewen, Switzerland
Filed Nov. 12, 1971, Ser. No. 198,163
Claims priority, application Switzerland, Nov. 12, 1970, 16,769/70
Int. Cl. B29c 17/02
U.S. Cl. 264—243
7 Claims

ABSTRACT OF THE DISCLOSURE

Brushes or parts thereof including the bristles are produced by injecting plastic material into the cavity of a mold comprising a plurality of segments each having at least one opening therein, the openings forming the cavity. The openings in the segments at opposite ends of the cavity are designed to retain a base section and a head portion respectively of the molded plastic material so that when these two segments are subsequently moved away from each other the connecting plastic material is stretched forming bristle shafts of improved strength with the molecules therein oriented. The head portion is then either severed from the shaft or means is provided for pressing the head portion through the hollow spaces of each of the intermediate segments to remove the brush or part thereof from the mold.

---

Figure 1:
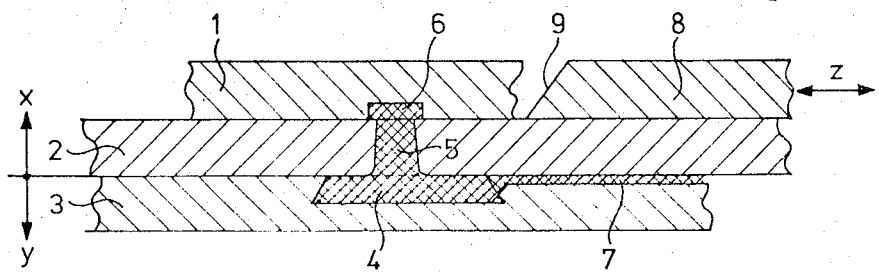

In brush manufacture at the present time a number of processes are known. Brushes of all kinds with synthetic and natural bristles, are produced by stamping in, bunches of, bristles into prepared bristle holders, by "threading in" bristles used, for example, in the production of brushes for cleaning bottles, by securing bunches of bristles by means of wire loops in the case of certain types of brushes, etc. Besides that, brushes with synthetic bristles made of polyethylene also are produced by the injection molding process, whereby relatively thick and short bristles result which are suitable for hair and massaging brushes. Such bristles can be cut in a longitudinal direction subsequently, in order to achieve smaller cross sections, whereby, however, the quality of the bristles as a rule will suffer.

Lately a process has become known in which relatively thin bristles are produced by extrusion stamping. However, bristles produced both according to the injection molding process and the extrusion stamping process do not come close to the quality of the bristles which customarily are used for brushes of the traditional types.

An object of the present invention, is a process for the production of brushes or parts of brushes called "bristle holders" in which any the step of inserting bristles in the bristle holder is omitted, that is to say in which the bristles and the bristle holder are made integrally, without the disadvantages described above. A further object of the present invention is a device to carry out the above mentioned process.

The process for the production of brushes or bristle holders according to the invention comprises the injection of a thermoplastic synthetic substance or a material similar to a thermoplastic substance into the chamber of a multipart separable molding tool to form a bristle body consisting of the bristle holder, the shaft of the bristle and a thickened section at the extreme end of the shaft of the bristle. The bristle shaft is then stretched to a certain length by means of relative movement between parts of the molding tool containing the bristle holder and the bristle shaft, which relative movement is in the direction of the longitudinal axis of the bristle shaft. Both the bristle holder and the thickened section or head part of the bristle shaft are anchored in separated sections of the molding tool provided for their production. The thickened section at the extreme end of the bristle shaft after the stretching process has been completed, is either severed from the bristle shaft or pressed through a part of the chamber to remove the molded bristle.

In a preferred embodiment of the process according to the invention, prior to closing the mold, a handle for the brush with a section to receive the brush holder containing the bristle body is inserted into the section of the molding tool provided for the molding of the bristle holder. In a further embodiment of the invention, using a two pistion injection molding machine, first of all a handle element for the brush is molded from a first plastic, in which handle element a recess serving for reception of the bristle holder has been provided, in a second molding step, the bristle body is formed.

The device according to the invention, is characterized in that the molding tool comprises a plurality of individual parallel segments which form a hollow space for molding and are movable relative to one another for stretching the bristle shaft. The device may include means for the rejection of the thickening at the outside end of the bristle shaft, and may include a section which has for molding a brush handle from a second plastic material.

By stretching or extending the bristles made of plastic, the bristles will have a considerably higher strength due to the resultant alignment of the molecules. With this process it is possible to produce bristles of a quality which correspond approximately to the quality that can be achieved with synthetic bristles produced in other way. A very economical method of production is possible.

Figure 2:
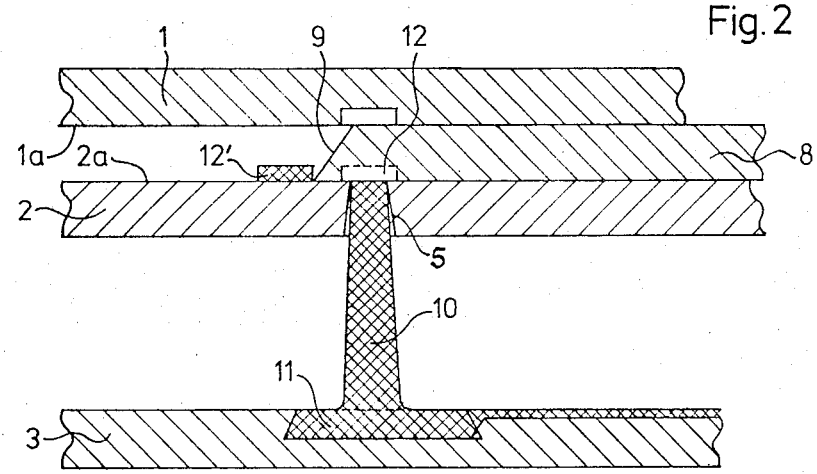
Figure 3:
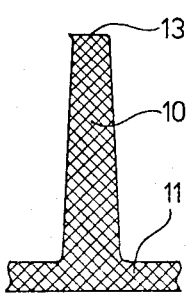
Figure 4:
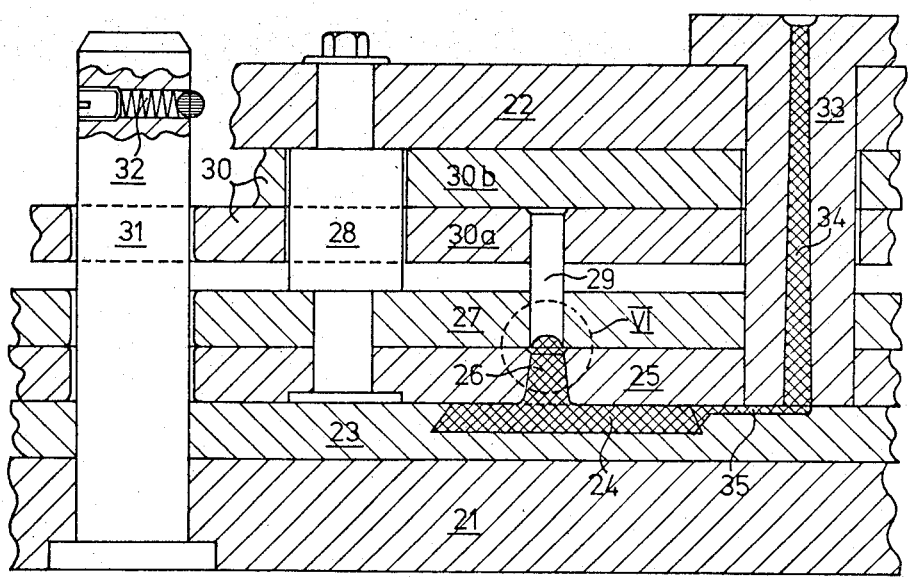
Figure 5:
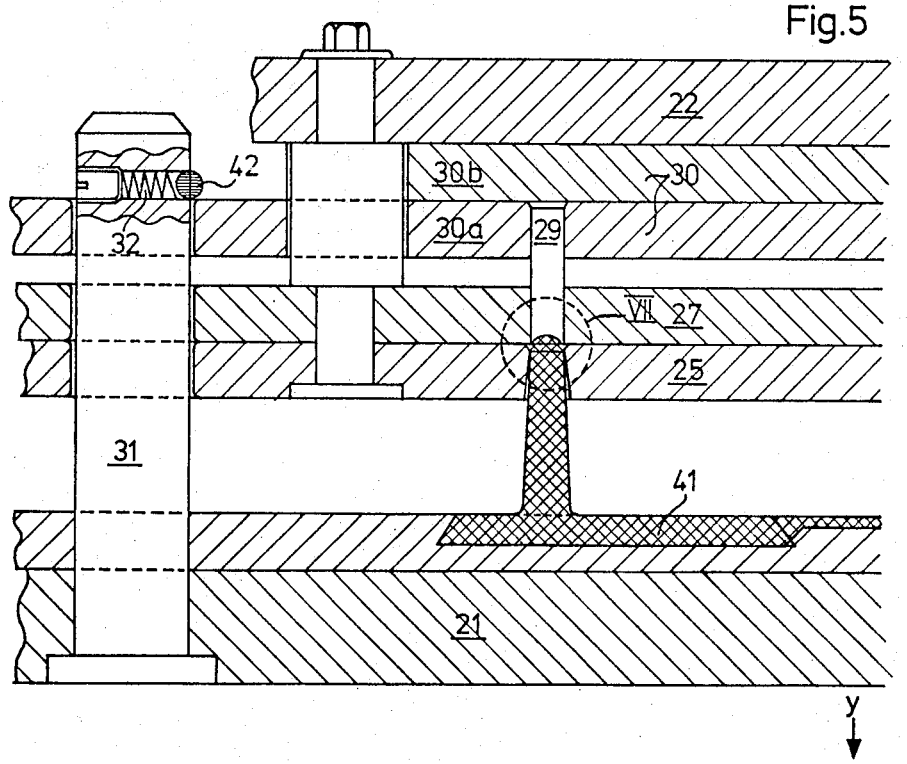
Figure 6:
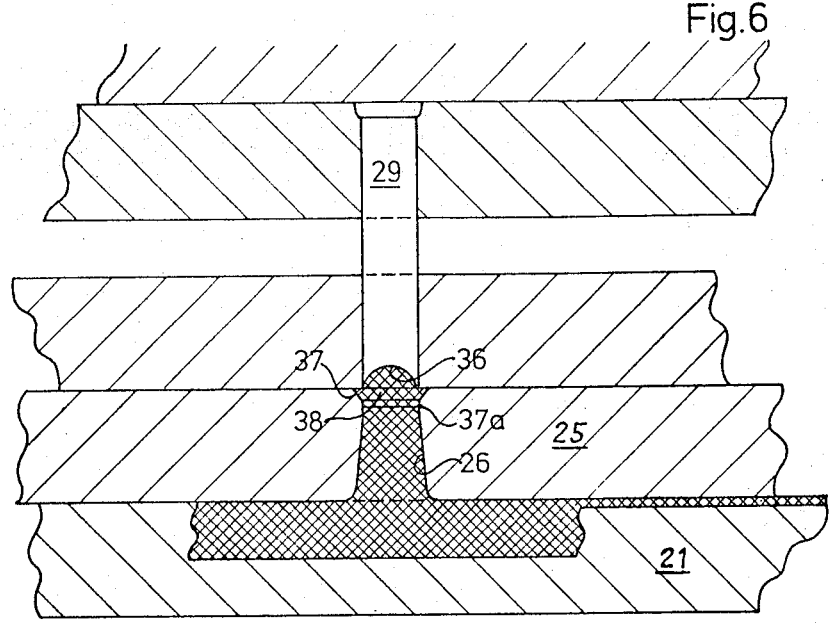
Figure 7:
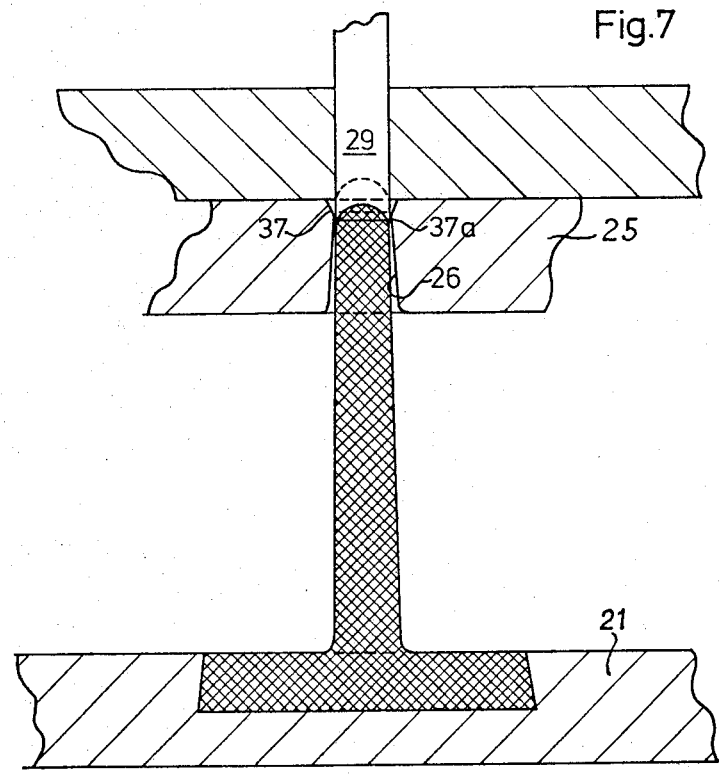

Embodiments of the process and apparatus according to the invention are described as examples in the following description including the drawings. In the drawings:

FIG. 1 shows parts of a molding tool in section in closed position a first step in the process for the production of a bristle, FIG. 2 shows the parts of the molding tool of FIG. 1 in an opened position and a second step in the process for the production of a bristle, FIG. 3 shows an individual bristle ejected from the molding tool, FIG. 4 shows in section parts of a molding tool for production of bristles with budged ends, the parts being in closed position during the execution of a first processing step, FIG. 5 shows the parts of the molding tool of FIG. 4 in an opened position and a second step in the process for the production of a bristle, FIG. 6 shows in larger scale details of the structure of the tool, for a bristle to be made with a bulged end as seen within the circle VI in FIG. 4, and FIG. 7, likewise on a larger scale, shows the shaping of the outside end of the bristle produced in the tool according to FIG. 4.

In FIGS 1 to 5, for reasons of clarity, only the production of one bristle is shown, whereas actually the arrangement in the molding tool all bristles on one bristle body to be produced concurrently with the bristle holder.

In FIG. 1 a part of an injection molding tool is shown, wherein molding elements of the tool are designated 1, 2 and 3, which elements are guided in a manner not shown in order to maintain uniform mutual alignment. The molding elements 1, 2 and 3, as becomes clear from FIG. 2, can be drawn apart in the directions shown by the arrows X and Y. The molding parts 1, 2 and 3 are each provided with hollow spaces 4, 5 and 6, which together serve for reception and molding of the plastic material for the bristle body of a brush that is to be produced. The hollow section 4 serves for formation of the bristle holder, section 5 for formation of the bristle shaft and section 6 for formation of the head element at the extreme end of a bristle, the purpose of which sections will subsequently be described.

Hollow space 5 of the mold is an aperture which tapers conically upwards.

The bristle holder, contrary to the presentation shown in FIG. 1, may have a corrugated or zig-zag shaped longitudinal profile in order to achieve positioning of bristles in bunches such as is customary in modern brush manufacturing methods. With such an arrangement the brush bundle is not disposed running parallel but slantingly with reference to the rows of bristles. Since the bristles in the production process described can be produced only running parallel to one another, the later "special positioning" will be achieved by drawing the corrugated or zig-zag shaped bristle holders flat.

The reference number 7 designates a sprue for the supply of the plastic material that is to be injected, which sprue is located in the topside of molding element 3. Furthermore, a slidable knife 8 with a cutting edge 9 is provided which can be shifted forward and backward in the direction of arrow Z on the smoothly ground upper surface of the middle molding element 2.

The hollow space 4, in which the bristle holder lies, can be adapted to accommodate a prefabricated part of the brush, in which anchoring means to hold the bristle holder on the handle of the brush may be provided.

The production of the bristle body consisting of the bristle holder and the bristles is accomplished using the specially designed molding tool in conjunction with a "standard" injection molding machine, preferably of a traditional design. Optionally a use of so-called two injection molding for the successive production of the bristle body and of the handle of the brush may be used.

In the operation of the molding tool, which is shown in position in FIG. 1, a suitable plastic material, i.e., polyamide, is injected via sprue 7 into the hollow space 4 of the mold by the operating stroke of the injection piston of an injection molding machine, not shown. The hollow space 4 and subsequently hollow spaces 5 and 6 are filled.

After the injection process, the molding tool is opened and its parts are separated to positions which becomes apparent in FIG. 2. The molding element 3 connected for example with a movable clamping plate of the injection molding machine (not shown) moves downward in the plane of the drawing of FIG. 2, while the molding element 2, which likewise is associated with a movable molding plate, moves to a position in which its topside 2a is spaced from the adjoining surface 1a of the molding element 1, connected in the present case with a fixed clamping plate of the injection molding machine. The distance between the 2 surfaces 1a and 2a is sufficient for a sliding knife 8 or its cutting edge 9 to be pushed forward into the position shown above the hollow space 5 in the middle molding element 2.

Owing to the initial shape 5 of the bristles resulting from the shape of the hollow space when the molding tool is closed (shown in FIG. 1 by a cross hatch), there results a stretch or extension of the bristle shaft designated by 10 in FIG. 2 during the separation of the molding elements 2 and 3. The bristle holder 11 is anchored in hollow space 4, which is indicated by the dovetail outline shown in FIGS. 1 and 2, and the head 12 of the bristle formed in hollow space 6 (broken line in FIG. 2) effectively anchors the end of the bristle to the molding element 2.

As a result of the described relative movement between the molding elements 2 and 3, a stretching of the bristles and with it the alignment of the molecules will be achieved, resulting in a bristle having a considerably higher strength. As a result the quality of bristles is improved to the point they practically correspond to the best synthetic bristles which could be produced heretofore. At the same time, a reduction of the diameter of the bristles occurs which is governed by the desired or permissible degree of stretching of the plastic material used.

After bristle 10 has been stretched, sliding knife 8 is pushed across the upper end of the bristle to such a point that, in doing so, head 12 or 12' of the bristle is sheared off, whereupon the end of the bristle is ejected from hollow space 5 of molding element 2 by resilient action or is ejected after withdrawal of the sliding knife 8 and relocation of molding element 2 against molding element 1. The ejection of the bristle body from molding element 3 is accomplished preferably in a conventional manner by means of ejectors and has not been shown here.

FIG. 3 shows a bristle with a head element 13 made with a sharp edge and produced according to the description given above. It is understood that even during ejection or immediately afterwards, the sprues of plastic material in channel 7 are separated from bristle holder 11.

The molding tool shown in FIGS. 1 and 2 is ready for an additional manufacturing operation after ejection of a bristle body described and the reclosing of the mold.

In FIGS. 4 and 5 a molding tool for the production of bristle bodies with bristles rounded at the outside end and operating according to the above described manufacturing method is shown. Reference numerals 21 and 22 designate parts of the tool which are connected with the movable or fixed clamping plates of a traditional injection molding machine for plastic. A molding plate 23 is mounted on tool element 21, which corresponds to molding element 3 in FIGS. 1 and 2 and which contains hollow space 24 for molding of the bristle holder. Above it lies a second molding plate 25 which correspond to molding element 2 in FIGS. 1 and 2 and which contains a space section 26 tapering upwards for molding of the bristle shaft. Molding plate 25 together with guide plate 27 are firmly connected by means of supporting bolts 28 (only one of which is shown) with tool element 22. A molding and ejecting pin 29 is guided slantingly in the guide plate 27, while anchored in a tool element 30 which is movable relative to tool elements 21 and 22. Tool element 30 carries out functions of molding element 1 in a certain sense, according to FIGS. 1 and 2 and it consists of a lower supporting plate 30a for the pin and an upper supporting plate 30b. Tool element 30 is controlled in regard to its function as an ejector plate by driving pins 31 (only one of which is shown), which are firmly connected with tool element 21. In the present example, a spring loaded ball stop 32 serves as the driving means, which upon opening of the injection tool for the plastic acts upon the lower plate 30a (FIG. 5) or (not shown) on the upper plate 30b of the tool element 30. Other driving means suitable for the purpose (not shown) in the form of latches, wedges, rubber cushions, hydraulic or pneumatic devices or core hoists can be used instead of the ball stop shown.

A central injection nozzle 33 also is connected firmly with tool element 22 which, as mentioned above, is connected with the fixed clamping plate of the injection molding machine as well as with plates 25 and 27, via the bore 34 through which plasticized synthetic material is fed into sprue channel 35, each of which leads to a hollow space 24 of the mold.

In order to impart a bulged surface to the outside end of the bristle that is to be formed, and, on the other hand, in order to hold the upper end of the bristle firmly in molding plate 25 for stretching after ejection, according to FIG. 6, on the other hand, the lower end of pin 29 is provided with a spherical segment shaped indentation 36 and, on the other hand, the upper end of the hollow space 26 of the mold is provided with a bevel 37 widening towards the edge. As a result, a thickening 38 develops at the end of the bristle shaft, so that the bristle shaft is held in molding plate 25 for the purpose of carrying out the stretching.

Description of the operation of the embodiment of the tool according to FIGS. 1 and 2 are appropriate also for production of bristle bodies or brushes with the tool according to FIG. 4. After the injection molding tool has been brought into the closed condition shown in FIG. 4, the injection process takes place by which plastic material suitable for the production of bristles is injection via bore 34 in the injection nozzle 33 and sprue channel 35 into the hollow spaces 24 and the 26 and the indentation in pin 29. The bristles are injected in the manner described previously.

The molding tool is opened after the injection process, and its parts are moved to positions which are shown in FIG. 5. Simultaneously, tool element 21 in the plane of the drawing of FIG. 5 and which is connected with the movable clamping plate of the injection molding machine moves down in the direction of arrow Y, while the tool element 22 is fixed. With the downward movement of tool element 21, the molding plate 23 connected with it, as well as the bristle holder 41 anchored in it, travels downward. Molding plate 25 and guide plate 27 at first remain in their original position relative to clamping plate 22.

During opening the molding tool according to FIG. 4 the plastic body corresponding to the initial shape of a bristle, is stretched to the length shown in FIG. 5. Owing to the already mentioned anchoring of the two ends of the bristle, a stretching of the bristle shaft is assured.

In order that the thickening, more clearly visible in FIG. 6, at the upper end of the bristle can merge from hollow space 26 during the ejecting taking place subsequently, the tool element 21 must be again pulled downwards by a certain distance which is somewhat longer than the thickness of the molding plate 25. At the same time, ball 42 of the ball stop 32 on driving pin 31 comes into engagement with lower plate 30a of the pin and the tool element 30 together with the molding and ejecting pin 29 is pulled downwards. The front part of pin 29, as can be seen best in FIG. 7, at the same time arrives in the beveled end 37 of hollow space 26 and thereby ejects the end of the bristle through the calibrating zone 36a, as a result of which at the same time a further, possibly undesirable stretching of the bristle is prevented and also a compression of the end of the bristle is avoided. Because the bristle material at this time has not yet been completely stabilized, the thickening of the material is pressed back immediately below the bulging when pulled past the calibrating zone 37a, so that this results in a practically smooth surface on the bristle. It is understood that the molding and ejecting pin 29 can have some other shape in order to be able to carry out its double function. In particular, an embodiment is possible which is structured telescope fashion and has a resilient middle or jacket element, through which the tasks of the molding and ejecting can be divided in a suitable manner.

The molding tool described according to FIGS. 4 and 5 is ready again for further manufacturing operations after the described ejection of a bristle body and the reclosing of the mold.

The temperature conditions preferred for the stretching are adjusted by means of heat and/or cooling agents (not shown) attached in a suitable manner in molding plates 2, 3 or 23, 25, which are controlled by temperature control elements. The stretching also can be influenced by air blown in during opening of the mold. The cross sections of the bristles can have practically any desired shape, therefore they can be round, triagonal, square, hexagonal or octagonal.

The details of the process described previously are directed preferably to the production of the bristle body, i.e., bristles and bristle holders containing the bristles. However, because oftentimes materials of varying hardness, with different colors or otherwise variable are required for the bristles and the brush handle, it will be relatively rare that brushes are produced that are made from one material. However, without any special reference having been made in the drawings, it is clear to the person skilled in the art that the hollow spaces 4 (FIG. 1) and 24 (FIG. 4) also can be shaped in such a way that for example first a suitably shaped element of the handle is inserted therein, whereupon the bristle body is injected onto it.

Experts with a knowledge of the possibilities of operation with so-called two-piston machines will understand without difficulty on the basis of the preceeding explanations that in a suitably constructed tool either first the bristle body is produced and subsequently the handle of the brush, or vice versa, by injection of a first material. In this manner brushes can be produced in fully automatic work cycles.

From this follows that according to the process described and the tools explained, brushes can be produced with synthetic bristles in an extremely economical manner. The possibility of the production of bristles with bulged ends is of considerable importance particularly for fabrication of toothbrushes, because the bristles cut "from the strand" frequently have sharp edges and points at their ends which have proven to be unsuitable for dental hygiene and which therefore have to be ground smooth in addition.

While according to the processes known heretofore for the production of brushes, thin bristles could only be used for brushes in a bristle body, it is possible according to the process described to arrange these bristles in any desired configuration and within certain limits also with differing lengths. The process according to the invention permits the production of bristles to minimal diameters of approximately 0.1 mm. Brushes of practically any desired length can be produced and the minimum distance between adjoining bristles may amount up to 0.05 mm. Depending on the gradation of the heights of the hollow space in the mold, one can also produce bristle patterns according to any desired profile.

We claim:

1. A process for producing a brush or a part thereof including the bristles comprising the steps of
    (a) injecting a plastic material into the cavity of a segmented mold to form a body comprising a base section in a first segment of the mold, at least one bristle shaft extending therefrom, each through at least a portion of an aperture in a second segment, and a head portion at the end of said bristle shaft opposite said base section and having a cross-section greater than said bristle shaft and the portion of said aperture containing said bristle shaft,
    (b) relatively moving said first and second segments of said mold a predetermined distance away from each other in the general direction of the longitudinal axis of the bristle shaft to extend and form an elongated bristle shaft, and
    (c) pressing said head portion on the elongated bristle shaft through said portion of said aperture in said second segment after said elongated bristle shaft has been formed to eject the head portion from the second segment of the mold.

2. A process according to claim 1 comprising the step of first inserting a preformed brush handle into said mold cavity before injecting said plastic material into the cavity, said handle being positioned in said cavity such that said base portion is formed on and secured to said handle, whereby a brush having a handle is formed.

3. A process according to claim 1 comprising the step of first molding a handle having a recess therein from a first plastic material in a portion of said mold cavity, said handle being molded at a position in said cavity such that said base portion is formed in said cavity, whereby a brush having a handle is formed.

4. A process according to claim 3 wherein said handle is molded with a recess having a dovetail shape about the perimeter thereof for retaining said base section.

5. A process according to claim 1 wherein said head portion is formed in a chamber defined by an enlarged beveled portion of the aperture adjacent the narrower portion of the aperture containing said bristle shaft and the end of a pusher member having a predetermined configuration, said pressing step being conducted by moving said pusher member into said aperture to press said head portion out of said beveled portion and into the narrower portion of said aperture reducing the cross-section of said head portion to substantially that of said elongated bristle shaft.

6. A process for the manufacture of brushes or bristle holders comprising the steps of
 (a) injecting a thermoplastic resin into the cavity of a segmented mold to form a body comprising a base section in a first segment of the mold and a plurality of bristle shafts in narrow portions of apertures in a second segment of the mold, each bristle shaft including a head portion with a cross-section greater than that of said bristle shaft and formed in a chamber defined by an enlarged portion of each of said apertures and the end of a pusher member having a predetermined configuration,
 (b) relatively moving said first segment with respect to said second segment including said pusher member a predetermined distance away from each other in the direction of the longitudinal axes of the bristle shafts to extend and form elongated bristle shafts, and
 (c) moving the pusher members in the opposite direction to press said head portions out of said enlarged portions of said apertures and to deform said head portions to a cross-section substantially the same as the remaining portions of the bristle shafts.

7. A process according to claim 6 wherein each of said head portions are pressed through a calibrated zone in the respective aperture to determine the final shape of the free end of the respective bristle shaft.

References Cited
UNITED STATES PATENTS

| | | | |
|---|---|---|---|
| 2,355,744 | 9/1944 | Myers | 264—243 |
| 2,592,296 | 4/1952 | Kutik | 425—805 |
| 2,583,441 | 1/1952 | Palmer | 264—318 |

ROBERT F. WHITE, Primary Examiner

T. E. BALHOFF, Assistant Examiner

U.S. Cl. X.R.

264—291, 296, 318, 336